April 30, 1957 G. BLACKSTOCK 2,790,326
AUTOMOTIVE TRANSMISSIONS
Filed March 27, 1953 3 Sheets-Sheet 1

Inventor
GIBBS BLACKSTOCK
by Fetherstonhaugh & Co.
Attys.

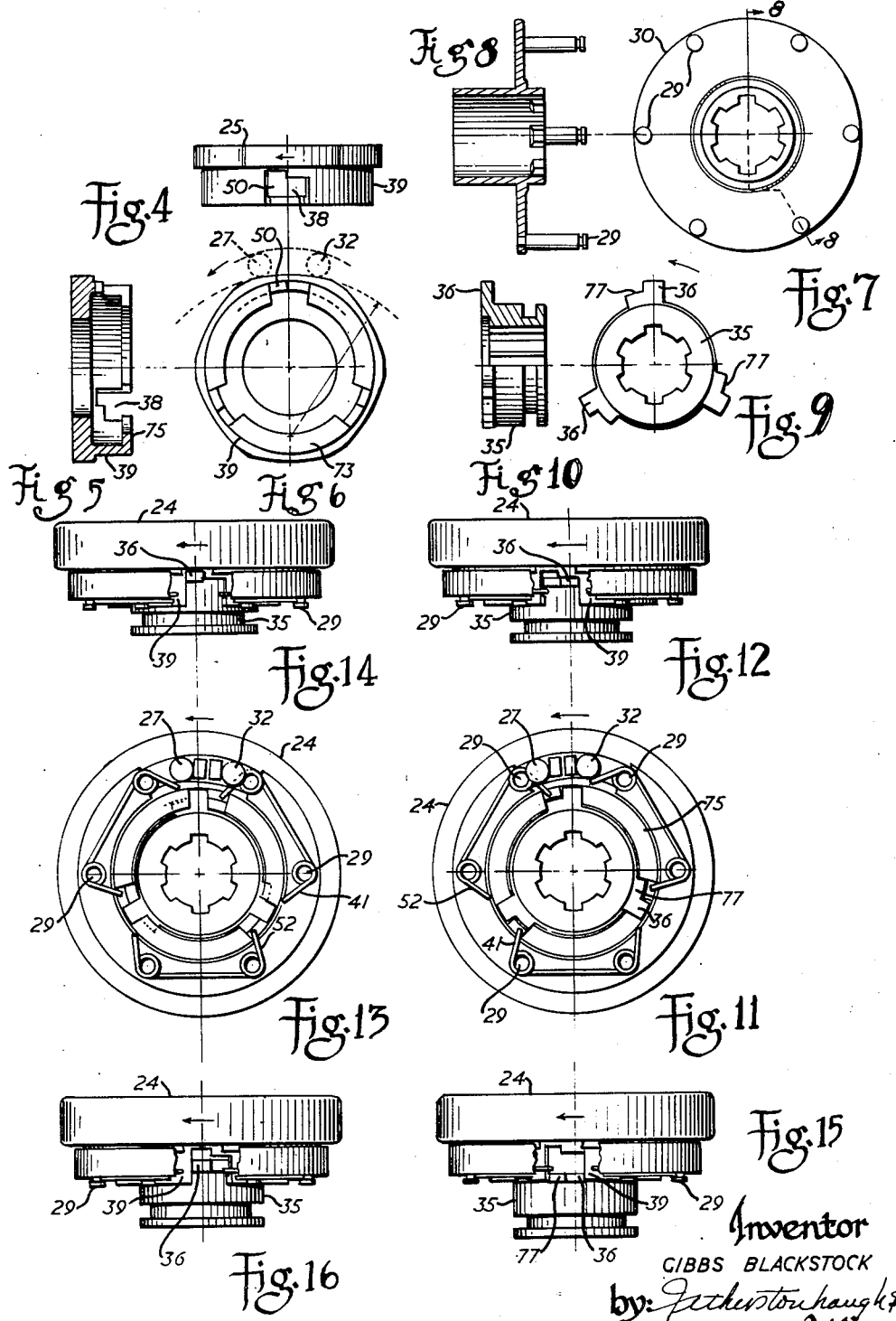

April 30, 1957  G. BLACKSTOCK  2,790,326
AUTOMOTIVE TRANSMISSIONS
Filed March 27, 1953  3 Sheets-Sheet 3

Inventor
GIBBS BLACKSTOCK
by: Fetherstonhaugh & Co.
Att'ys.

United States Patent Office 2,790,326
Patented Apr. 30, 1957

2,790,326

AUTOMOTIVE TRANSMISSIONS

Gibbs Blackstock, Toronto, Ontario, Canada; Mildred E. M. Blackstock and The Canada Permanent Trust Company, both of Toronto, Ontario, Canada, executors of said Gibbs Blackstock, deceased Application March 27, 1953, Serial No. 345,125

3 Claims. (Cl. 74—333)

This invention relates to improvements in automotive transmissions.

In recent years there have been extensive developments in the field of automobile and like transmissions and many systems with fully or semiautomatic gear changing or variable drives have been proposed. However, such transmissions are usually rather complex or require intricate control systems or elaborate adjuncts like fluid drives or torque converters.

My object is to provide a relatively simple system, automatic enough to give the driver what he really needs, namely, relief from the effort and distraction of the attention usually involved in gear changing in traffic.

Accordingly I propose to take advantage of a number of factors which are usually neglected. For instance: the few and unhurried changes desired on the highway can just as well be made by hand, and including them in the automatic range results in more complexity; it is only in traffic, where the driver has other distractions, that the changes need to be esentially automatic; there are some natural or habitual actions involving no special attention from the driver which can be used to make much of the gear changing effectively automatic, such as braking, declutching at very low speeds or throttling.

In the preferred simplest form of my invention the change up in traffic driving is by a momentary throttling, and practically all of the down changes are given by the braking involved in such driving.

A car can be driven in traffic with only two speeds, one suitable for starting and one for a high drive. Such a "two-speed traffic range," if reasonably automatic and with ratios not too far apart, is sufficient. In practice, however, there should be a still lower gear for steep grades, and preferably also a still higher one for good highway performance.

This gives what may be called a "four-two" type of transmission: a four-speed one of standard lay-out with a "two-speed traffic range" between indirect second and third drives, direct fourth being used for highway or open road. The drive is from the ordinary engine clutch; reverse, first, second and fourth are engaged in the usual way by lever, which is left at second for the "traffic range."

Suitable drive ratios form an important part of the design and in fact of the invention itself. First gear is low enough for steep grades. Second is as high or "fast" as will still allow for starting in usual traffic conditions and for fair acceleration. Third raito is not too far from second; since the engine slows through this "interval" to effect the change up, the smaller it is the quicker the change. Third is a suitable ratio for a high drive in traffic, a little lower and more flexible a drive than most standard thirds. The fourth, or axle, ratio is what best suits the engine and car for highway travel; not unduly high or fast, so as to avoid frequent down changes by hand. The usual combination of engine power and axle ratio is a compromise between demands for flexibility in traffic and speed on the highway, so most modern cars are over-powered. With the "four-two" design there are two "high" drives: fourth to give road performance by using an axle chosen for this special purpose, and third to give flexibility in traffic by use of a lower ratio and an easy change down to second; all with moderate engine power. The "four-two" design, with the traffic range and the ratios carefully selected for their several purposes, should not be confused with any multi-speed system, automatic or not, in which some two drives may casually or occasionally cover some or most of the traffic driving.

The means for providing the two-speed traffic range should include: an element like a plain free-wheel in the second gear; a suitable third gear coupling and, either within or outside it, suitable control means.

To avoid the use of elaborate controls or a complex or bulky coupling, the third coupling should be of a type that can unlock smoothly and reliably without special attention from the driver; it should be capable of some degree of free turning without load or wear or shock, during which it can lock or unlock. This property can best be found in some form of free-wheel coupling, easily locked and unlocked when running free, as when the throttle is closed to synchronize its parts for a change up or during braking; particularly one having the shell as part of the third gear train and a sliding lock between the cam and the driven shaft, all arranged so that when locked it gives a free-wheel drive and when unlocked lets the shell turn forwards freely. The ideal coupling for this purpose is my Reversible Free-Wheel Coupling, of which some forms have been shown in my Patents 1,942,197, 1,942,198, 1,942,374, 2,225,309; an improved construction being described below. For brevity it may be referred to as the RFW clutch or coupling.

This RFW coupling locks automatically on synchronization and lends itself to a very simple control for the down changes: a resilient unlocking connection to the clutch and brake pedals. While the driver can at will use the clutch pedal to change down at any speed, the brake pedal and the braking provide gear changing to which I shall refer as being "practically or effectively automatic." As will be seen later, with a typical two-speed traffic range in a four-two type of transmission, a down change results when braking is continued down to about eight or nine M. P. H. The term "effectively automatic" is justly applicable here because a car with a flexible drive does not normally need a change down at over eight M. P. H. and very seldom slows to such a speed except by braking. Furthermore, traffic driving usually involves so much braking, accelerating and throttling that both the down and up changes occur almost unnoticed by the driver; so that by taking advantage of the acts for operative control a result is achieved which is automatic insofar as demand upon the driver is concerned.

Road tests have shown that the simplest form of the invention with the RFW coupling and the pedal control is sufficient for the ordinary passenger car and driver. However, to widen the scope, to cover more types of car and of drivers' preferences, and to show the general applicability of some elements like the pedal control, I shall describe other contrivances which form part of a complete machine, such as: governor control, an anti-free-wheeling device, and a modification of the third gear coupling reacting to the controls just as the RFW coupling does.

It will be understood that no limitations of scope are intended or admitted by reason of the specific structures to be described.

Figure 1 shows a longitudinal section of the transmission.

Figure 2 the positions of the gear lever.

Figure 3 a fragmentary cross section of the second gear free-wheel.

Figure 4 the cam of the RFW coupling.

Figure 5 is a sectional elevation of the cam of Figure 4.

Figure 6 is an end elevation of the cam of Figure 4.

Figure 7 a stud-carrying plate, part of the RFW coupling.

Figure 8 is a section on the line 8—8 of Figure 7.

Figure 9 the sliding lock of the RFW coupling.

Figure 10 is a side elevation of the sliding lock of Figure 9 partially broken away in section.

Figure 11 the RFW coupling, face view, the cam in the release position.

Figure 12 the RFW coupling, top or side view, cam in the release position.

Figure 13 the RFW coupling, face view, cam in the drive position.

Figure 14 the RFW coupling, top or side view, cam locked in the drive position.

Figure 15 the RFW coupling, top or side view, cam locked in the release or reverse position.

Figure 16 the RFW coupling, top or side view, cam in the drive position, unlocked.

Figures 2, 17, 21:
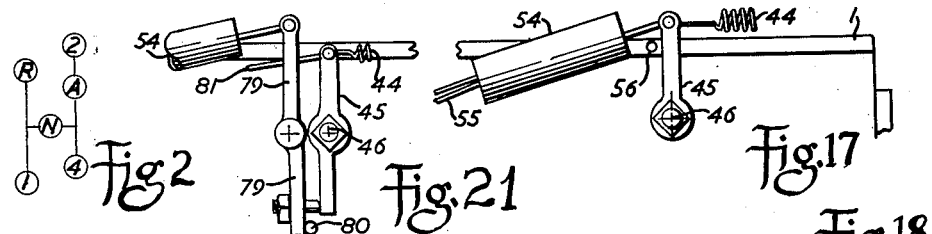

Figure 17 a form of pedal control for the RFW coupling.

Figures 18, 19, 22, 23:
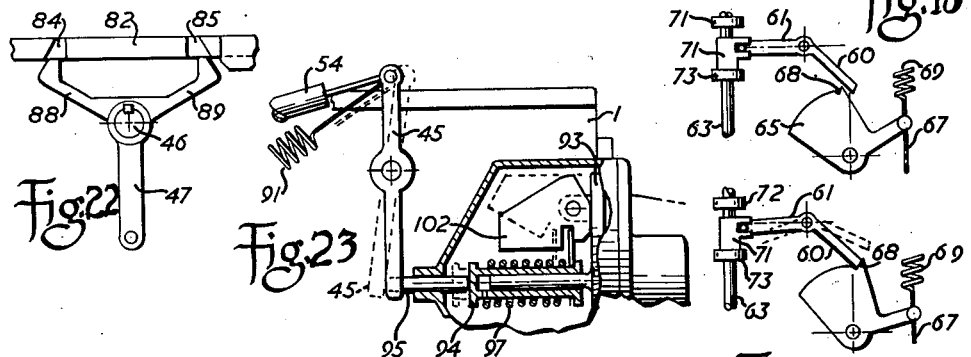

Figures 18 and 19 a device for varying the idling speed of the engine.

Figures 3, 20:
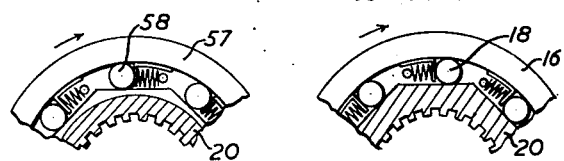

Figure 20 a fragmentary cross section of an anti-free-wheel device.

Figure 21 an alternative pedal control for the RFW coupling.

Figure 22 a type of detent selectively preventing operation of the RFW coupling.

Figure 23 a form of governor control for the RFW coupling.

Figure 24:

Figure 24 a form of hollow clutch roller.

Figure 25:
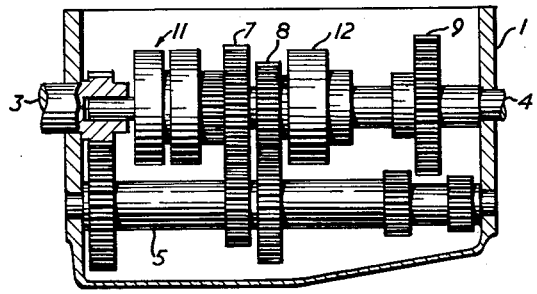

Figure 25 a diagrammatic view of the transmission.

Figures 26, 27, 28, 29:
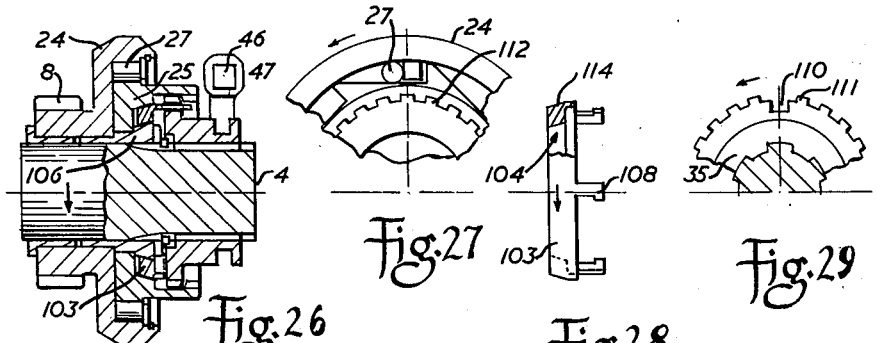

Figure 26 an alternative form of third gear coupling, longitudinal section.

Figure 27 the alternative coupling, fragmentary face view.

Figure 28 the alternative coupling, the balk-ring.

Figure 29 the alternative coupling, fragmentary face view of the sliding lock.

Figures 30, 33:
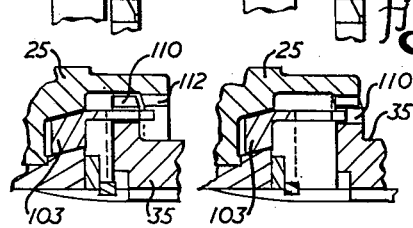

Figure 30 is a fragmentary section of the alternative coupling in the unlocked condition.

Figures 31, 32:
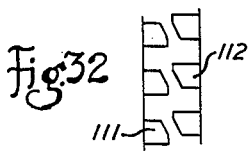

Figure 31 shows the balk-ring detents holding the lock so that the clutch teeth are in clearance.

Figure 32 shows the clutch teeth at a position of clearance as in Figure 30.

Figure 33 shows the locked position of the components of Figure 30.

Figures 34, 35:

Figure 34 shows the locked position of the balk-ring detents.

Figure 35 shows the locked position of the clutch teeth.

Figure 36:
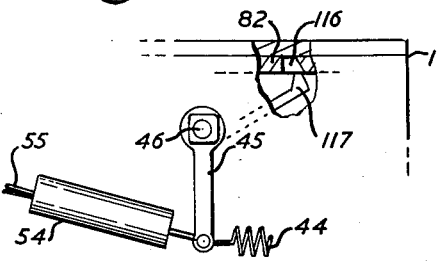

Figure 36 pedal controls for the alternative coupling.

Like reference numerals in the different drawings indicate similar parts.

The arrows show the direction of normal forward rotation.

Before going over the systematic description based on the detailed drawings, we might consider the diagrammatic Figure 25 showing the arrangement of a "four-two" transmission in its simple form; the housing 1, the drive shaft or pinion 3, the driven or mainshaft 4 and the countershaft 5 of which have a standard type of lay-out. 7 is the second gear and 8 the third gear, forming the two-speed traffic range. 9 is the usual first-reverse sliding gear. 11 is a sliding unit having a free-wheel element to connect the second gear and a positive connection for the drive shaft 3. 12 is the third gear coupling. The pinion 3 is driven from the usual engine clutch. 9 and 11 are controlled by gear lever, while the coupling 12 is effectively automatic; we may suppose it to have a resilient unlocking connection to the clutch and brake pedals. In traffic the lever is set at second which moves the unit 11 to the right making a free-wheel connection with the second gear, in which the car is usually started. The change up to third, the high of the traffic range, is made by a momentary throttling to synchronize the coupling 12, which can then take on a free-wheel drive. Braking unlocks the coupling, which usually relocks later, but if it is continued down to a car speed "V," about eight or nine M. P. H. in a typical case, where the driving part of the coupling, driven from the now idling engine, is faster than the mainshaft 4, it cannot relock, so there is a change down to second. The driver can make the change down at any speed by pressing the clutch pedal and having the throttle open enough to make the third gear 8 faster than the shaft 4, at very low speeds the idling engine is fast enough. With either pedal, the release is by an unlocking combined with a forward turn of the driving part of the coupling. A coupling of the type indicated here and described below reacts to the simple brake pedal control where the usual positive dog clutch would require frequent attention from the driver or some elaborate control system. Road tests with this control do show an effectively automatic gear changing.

The driver can start in first gear and then change by hand to second if the start is on a steep grade; and on the highway he can change by hand to direct fourth (the unit 11 to the left locking the two shafts 3 and 4 together) and back to the traffic range. For ordinary passenger cars no extras are necessary, no governor, no fluid drive, no electrical contrivances. A good performance needs only: reasonably silent helical gears for the indirect third drive, since gear noise may incline the driver to make a really unneeded manual change to direct fourth; a reasonably soft engine clutch for starting in second gear, preferably with a good over-centre spring so that the clutch can be held open at short halts instead of going into neutral; and properly chosen drive ratios.

Figure 1:
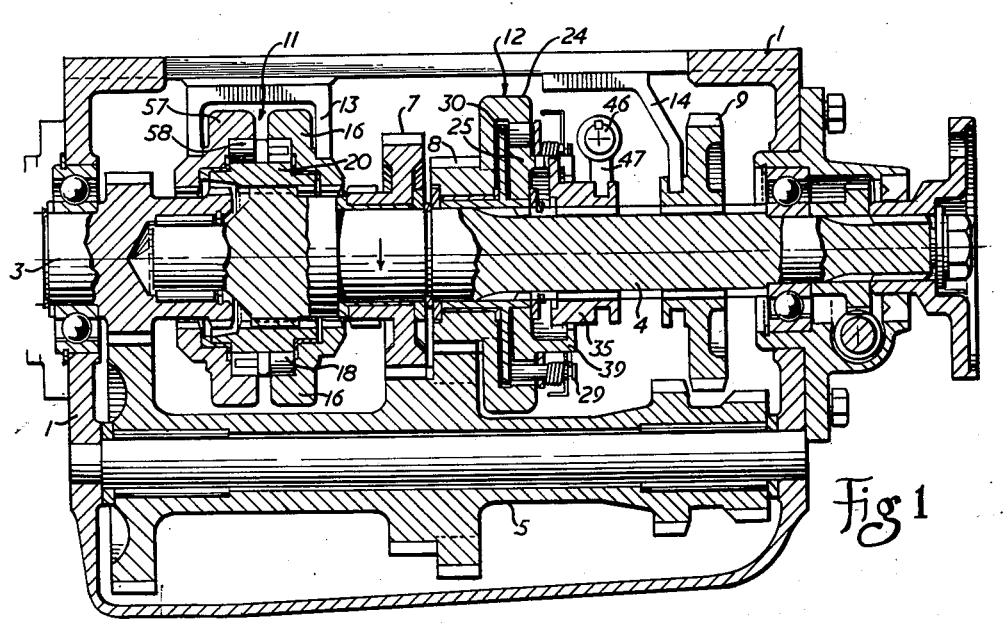

Figure 1 shows the complete assembly. 1 is the housing, 3 the drive shaft or pinion, 4 the main or driven shaft, and 5 the countershaft; 7 is the second gear, 8 the third gear and 9 the usual first-reverse sliding gear. 11 is a sliding unit including the second gear free-wheel and 12 the third gear RFW coupling. The unit 11 and gear 9 are controlled from the gear lever by the forks 13 and 14. The gear 9 is splined and gears 7 and 8 freely mounted. Figure 2 shows the gear lever positions: N for neutral, 1 for first, R for reverse, A for free-wheel second giving the traffic range, 2 for positive second and 4 for direct fourth.

In traffic the lever is set at A, moving the unit 11 one step to the right so that clutch teeth on the shell 16 engage those on the second gear 7, this giving a free-wheel drive through the shell 16, rollers 18 and the cam 20 splined on the mainshaft 4, see also Figure 3. The other shell on the sliding unit may be ignored for the present. The car is usually started in second gear, the third gear coupling being released.

The principle of the RFW coupling is that the cam has about 15° angular freedom on the shaft between a drive position in which it can be locked and a release or reverse position, there are two oppositely acting sets of cam faces and of rollers, drive and catch rollers, and fixed studs which allow only the drive rollers to act when the cam is in the drive position and only the catch rollers in the release position.

In Figures 1, 11 and 12 the RFW is released, the cam in the release position or unlocked. The shell 24 is integral with the third gear 8 and can turn forwards freely. The cam 25 shown in Figure 6 is in Figure 7 shown in the release position, the drive rollers 27 are held from contact with the cam by the kick-studs 29 on the plate 30 integral with the mainshaft 4, while the catch rollers 32 are "on"; the kick-stud plate is shown in Figure 7. The sliding lock is shown in Figure 9. The dogs 36 working in the slots 38 in the cam flange 39 allow the 15° play mentioned. The spur shoulders on the dogs and the in-turned lip on the flange may be ignored for the present. The cam is held yieldingly in the release position by spring torsion fingers 41 on the kick-studs. The splined lock is pressed towards the cam by the action of the lock spring 44 of Figure 17 working through the arm 45, pivot rod 46 and the fork 47 shown in Figure 1; but it cannot lock as the dog 36 in Figure 12 is not in line with the lock pocket 50 in the cam 25, see Figure 12.

The change up is accomplished by closing the throttle. The second gear over-runs and then the RFW shell 24 turns backwards relatively. The catch rollers 32 grip and turn the cam back also, the drive rollers 27 come on, then the catch rollers 32 meet the studs 29 and are "kicked off" as the spring fingers 52 turn the cam back the last 4° or so to the drive position, as in Figures 13 and 14. The lock dog 36 is pressed into the lock pocket 50 and the cam 25 is "drive-locked." With the catch rollers off and the drive rollers on but slipping, the coupling runs free until the throttle is opened when it gives a free-wheel drive through third gear.

The change down comes from an unlocking combined with a forward turn of the shell 24. The unlocked cam 25, Figures 13 and 16, is turned forwards by the drive rollers 27 and the spring fingers 41, the drive rollers are kicked off and the catch rollers 32 come on and slip as in Figures 11 and 12. The coupling is released and the drive passes to the second gear 7. The unlocking connections are shown in Figure 17, where 54 is an initial tension spring or spring cylinder effectively stronger than the lock spring 44, and 55 the leads to the clutch and brake pedals. At any speed the driver can change down by pressing the clutch pedal, if the engine is fast enough to turn the shell forwards as the pedal rises; here we have the combination of unlocking and forward turn; the lock is relieved of load by opening of the engine clutch and can slide on its splines. 56 is a stop stud to limit the motion of the arm 45 and the fork 47 to that required to unlock the coupling.

Braking unlocks the coupling, at higher car speeds it relocks afterwards since the cam is in the drive position as in Figure 14. But if braking is continued down to a critical speed V where the shell, driven by the now idling engine, is faster than the shaft 4, the cam is turned to the release position and cannot relock; we have the combination of unlocking and forward turn that gives the release and change down to second. Should the car slow right down without braking, the driver will almost instinctively press the clutch pedal if the engine labours, the idling engine being fast enough to give the shell a forward turn. The coupling lends itself well to the simple control, and after turning over either way it at first runs free, the rollers come on and off only when there is no load since the cam is then unlocked, so the whole is shock-proof, foolproof and specially free from wear.

The change down speed V depends on the third drive ratio and the engine idling speed; it can be raised with faster idling, within reason since too fast idling means longer to slow down for the change up. With a third ratio like 4.55 to 1 and a second of 7.4 to 1, the "interval" being 7.4/4.55 or 1.63, it is easy to adjust the idling to get a good change up and a change down at about eight M. P. H. I found that this gave a very good performance and the changes in traffic were in fact practically automatic as a result of the braking, accelerating and throttling one naturally does in driving.

If the driver wishes to start in or change to first, he moves the lever to position 1 in Figure 2, the sliding gear 9 moving to the left. On the highway he changes by hand to direct fourth, lever to position 4, the unit 11 moves to the left and the clutch teeth on the cam 20 engage those on the drive shaft 3 locking it to the mainshaft 4. He can change by hand back to the traffic range A; here I find that with closed throttle the change is to third, the RFW shell being slower than the shaft, while with open throttle it is to second, the shell being faster. Moving the lever to position 2 slides the unit 11 fully to the right, the clutch teeth on the cam 20 locking the gear 7 to the mainshaft 4 for a positive second drive, useful on descending steep hills.

A good example of suitable drive ratios for a passenger car is given by these figures: first 10.6, second 7.4, third 4.55, fourth 3.55, the interval being 7.4/4.55 or 1.63 the interval preferably is of a value between 1.5 and 2.2 to give a good traffic range with usual starting in second and a good highway performance with practically no down changes on highway hills if the road is clear.

The anti-free-wheel

The free-wheel couplings in the second and third drives allow unlimited free-wheeling in the traffic range. If one so wishes, this effect can be limited by an anti-free-wheel device as shown in Figure 20. A shell 57 is carried on the sliding unit 11 with backward acting rollers 58 between it and the cam 20. When the gear lever is moved to position A for the traffic range the clutch teeth on the shell 57 engage those on the drive shaft 3 and this prevents the mainshaft 4 from over-running the engine. As the shell 57 can freely over-run the cam 20, the device has no effect on the traffic range operation except to limit the over-run to the direct ratio. It has three effects in all: it limits the free-wheel effect, it provides a synchronizer for the manual change to direct fourth, it holds the car if halted on an up grade since the second free-wheel 16, 18 tends to turn the drive pinion backwards more than the anti-free-wheel will allow. Because of this last effect the second ratio should be lower than otherwise, to allow restarting on an up grade, say about 7.85 to 1.00.

Idling speed booster

While usually it is easy to find an idling speed setting that will suit both the up and down changes, yet where there is a large interval due to a lower second gear ratio or a faster third or where a higher change down speed is wanted on account of a lower powered engine, the idling speed for a good change down might be too high for a good change up. Here we want fast idling for the down change and slow idling for the change up. To meet this I have devised and tested the idling speed booster shown in Figures 18 and 19. The pivoted pawl 60, 61 works between the throttle rod 63 and a pivoted arcuate cam 65; 67 is a wire to the brake pedal, 68 is a notch in the cam and 69 a retractor spring. In Figure 18 the pedal is up, the pawl 60 free and the throttle closed giving slow idling at say 400 R. P. M. or less. When the brakes are applied the cam turns and lifts the pawl, the end 61 moves the rod 63 down and this boosts the idling to say 500 or over. The pawl catches in the notch 68, as in Figure 19, so the idling stays boosted when the pedal rises; the change down speed is raised. Opening the throttle for acceleration lifts the pawl as indicated by the broken lines in Figure 19, freeing the cam to return to its Figure 18 position. Then when the throttle is closed again the idling is slow and the engine slows down rapidly for a quick change up. The sleeve 71 may have some play on the rod 63 between the collars 72, 73, then the pawl will not be moved by partial opening of the throttle merely to keep the car moving, but will be tripped to reduce the idling speed only by wider opening of the throttle for acceleration. This keeps the engine running fast and prevents an unwanted change up at low car speeds.

The drag-lock

If one so wishes, the cam of the RFW coupling can be made so as to lock in the release or reverse position, with the catch rollers on, and thus transmit reverse torque or the "drag" of the throttled engine. For this the flange 39 on the cam 25 has an inturned lip 75 and the lock dog 36 on the sliding lock has a spur shoulder 77. Now if the spring force on the lock 35 is reversed, to press it away from the cam 25, and the throttle opened for an instant, the coupling is released (unlocking plus a forward turn) as in Figure 7. The lock is pressed further away from the cam and the dog 36 and shoulder 77 together fill the slot 38 in the flange 39, 75 and lock the cam 25 in the reverse position, as in Figures 11 and 15. The coupling can now transmit reverse torque through the catch rollers 32; it is now "drag-locked." With this feature the controls are slightly altered, as shown in Figure 21. In addition to the lock spring 44, arm 45 and pivot rod 46, there is a pivoted arm 79, worked by the pedals through the spring 54, which can move the arm 45 just far enough to unlock the coupling, note the stop stud 80. A lead 81 goes to a hand control from the arm 45 and by means of this the arm 45 can be turned to press the sliding lock 35 further away from the cam 25. Normal operation of the coupling can be resumed by letting go the hand control.

Figure 22 shows a detent system for preventing the locking of the RFW coupling except when the gear lever is at A. 82 is the sliding bar that carries the fork 13 of the sliding member 11 in Figure 1. When it is in the A position for second free-wheel gear the slots 84, 85 are opposite the ends of the arms 88, 89 of the fork 47 of the sliding lock, see also Figure 1, so the sliding lock 35 can move either way. But if the bar 82 is in any other position the lock cannot slide. If the lock is engaged, either drive-lock or drag-lock, the end of one of the arms, being in one of the slots, will prevent the bar 82 moving from the A position. The bar can move when the lock is in the neutral position and the lock can move when the bar is at A. If this "drag-lock" feature is not used the arm 89 and the slot 85 are omitted from the design.

Governor control

While pedal control is sufficient for the ordinary car, and in some special cases too if the idling speed booster is used, control by a special governor might be preferred where a quite high change down speed is wanted. A suitable type is one which tends to lock the coupling at higher speeds and to unlock it at lower. Such a type is shown in Figure 19 and has worked well. The arm 45 and pivot rod 46 control the sliding lock as in Figures 1 and 17. At low speeds the governor spring holds it unlocked against the fly-weights 92 on the disc 93 which is driven from a drive like a speedometer drive. As the speed increases above a certain value the weights swing out, pushing the sleeve 94 and the plunger 95 against the lower part of the arm 45 to lock the coupling. 97 is a spring which yields if the arm 45 cannot move. When the car speed has fallen to a certain value the governor spring overcomes the weights and tends to unlock the coupling. The arm 45 has the usual connection to the clutch pedal for changing down at any speed. In design the governor should be "unstable" in the sense that once the weights start to swing out the moment they exert on the rod 46 increases while that due to the governor spring decreases. Comparing the two controls, by brake pedal and by fly-weights: they are alike in that a change down depends on slowing the car to a predetermined speed (in one case by the idling speed setting, in the other by governor adjustment). With fly-weights the condition is: throttle closed as the car slows past say ten or thirteen M. P. H. to let the lock slide (which I find is always the case); with the pedal control: brakes on as the car slows past eight or nine M. P. H. (which is nearly always the case).

Hollow catch rollers

When the engine is switched off it is possible for the cam 25 to be left near the midposition instead of at one of the end positions, see Figures 4, 5, 6, 11, and 13, with both sets of rollers on. Then by uneven cooling the shell 24 could shrink and jam these oppositely acting rollers on the cam so that they might damage the kick-studs when the engine is restarted. If the catch rollers 32 are made hollow or tubular, while the drive rollers 27 are solid, the jam will be a light one and the rollers easily dislodged by the studs 29. The ramp angle or inclination of cam face to shell face should be larger or steeper than usual to facilitate dislodging. For what is called the drag-lock feature above, where the catch rollers have to take some real load instead of merely to turn the cam over to the drive position, these catch rollers 32 may have a solid steel core as in Figure 20. When the load comes on it the tubular part yields very slightly and the solid core 99 takes the pressure. The diametral clearance is very small, a few thousandths of an inch to allow for shrinkage of the shell.

The balk-ring clutch

Figures 26 to 36 show a modified form of third gear coupling which reacts to the controls just as the RFW coupling does, and which may be called the balk-ring coupling or clutch. Essentially it is a plain free-wheel clutch with only one set of rollers and a freely mounted cam which can be locked to give a free-wheel drive and unlocked to let the shell over-run the shaft, a balk-ring prevents locking while the shell over-runs the shaft and also serves to synchronize the cam and shaft under certain conditions to prevent scraping of the clutch teeth. The clutch is shown unlocked in Figure 26 and in the enlarged diagrammatic Figures 30, 31 and 32. The shell 24 is integral with the third gear 8. The cam 25 and rollers 29 are shown in the face view Figure 27. While the clutch is released the shell and cam are turning freely forwards. The lock spring in Figure 28, acting through the arm 45, pivot rod 46 and fork 47 presses the sliding lock 35 to the right, but the lock is prevented from engaging by the balk-ring 103 seen in Figures 26, 28, 30, 31 and 32. The inner cone 104 has frictional contact with the shell bushing 106, tending to turn the ring forwards. The hooked detents 108 which extend through the slots 110 in the sliding lock 35 shown in Figure 29 hold the lock as in Figures 30, 31 and 32 so that the clutch teeth 111 on the lock and 112 on the cam clear each other. It is the pull of the lock on the balk-ring detents that gives the friction at the cones 104 and 106, while the outer cone 114 is just clear of the cam 35. The change up is by throttling as with the RFW coupling. When the shell 24 becomes slower than the shaft 4 the friction at the cone 106 of the shell bushing gives a back turn to the balk-ring which, as can be seen from Figures 30 to 35, "unhooks" the balk-ring detents 108, the ends sliding into the slots 110 to free the lock 35 to move to the right and let the clutch teeth 111 and 112 engage. The cam is now locked to the shaft and the clutch can give a free-wheel drive. 54 and 55 in Figure 36 show the usual connection to brake and clutch pedals. Applying the brakes unlocks the coupling. If they are released at higher speeds where the shell 24 is slower than the shaft 4, the cam might tend to slow down with the shell, owing to the light frictional drag of the slipping rollers, and the clutch teeth scrape on re-engaging.

When the brake pedal is pressed, the lock after unlocking forces the balk-ring to the left, as can be seen from Figures 30, 31 and 32, pressing the outer cone 114 against the cam. This synchronizes the cam, the rollers slipping in Figure 27, so there will be no scrape when the pedal rises and the clutch teeth re-engage. If the braking is continued down to a speed where the shell is faster than the shaft, the rollers grip and both shell and cam turn forwards, the balk-ring gets a forward turn and the hooked detents prevent the teeth engaging as in Figures 30, 31 and 32. Similarly, pressing the clutch pedal unlocks the coupling, and if the shell is faster than the shaft it cannot relock; both methods give a change down just as with the RFW coupling. In Figure 28 the second gear sliding bar 82 has a slot 116 which is opposite the arm 117 of the pivoted rod 46 only when the bar is in the second gear free-wheel position A; otherwise the arm cannot rise to let the coupling lock.

What I claim as my invention is:

1. A transmission comprising: a drive shaft; an idler shaft in continuous drive relation with the drive shaft; a pair of different gears on said idler shaft; a driven shaft; a corresponding pair of driven gears rotatably mounted on said driven shaft and continuously meshing with said idler gears at different gear ratio; reversible unidirectional means coupling one of said driven gears to said driven shaft; a shiftable one way clutch device for coupling the other driven gear to said driven shaft; and means available to an operator for shifting said clutch device to a coupling position.

2. A transmission comprising: an idler shaft having two different idler gears mounted thereon; a driven shaft in parallel spaced relation to said idler shaft; two different driven gears rotatably mounted on said driven shaft and meshing with said idler gears in different drive ratio; free wheeling coupling means slidable on said driven shaft; independent shift means available to the operator for moving said coupling means into opeartive engagement with one of said driven gears; and an actuable free wheeling coupling device connected to another driven gear and operatively connecting said other driven gear and said driving shaft upon actuation thereof.

3. A transmission comprising: an idler shaft; second and third gears fixed to the idler shaft; a driven shaft in parallel spaced relation to the idler shaft; a driven gear rotatable on said driven shaft continuously meshing with said second gear; releasable second drive coupling means slidably mounted on said driven shaft; shift means for moving said coupling means into operative engagement with said driven gear to couple said gear to said driven shaft; another driven gear rotatably mounted on said driven shaft and continuously meshing with said third gear; releasable third drive coupling means connected to said other driven gear and operatively connected upon actuation thereof to said shaft; a third drive actuator available to an operator for actuating said third drive coupling means; and means in said second drive coupling means for releasing the same upon actuation of said third drive coupling means.

References Cited in the file of this patent
UNITED STATES PATENTS

| | | |
|---|---|---|
| 1,859,461 | Peterson | May 24, 1932 |
| 1,913,949 | Peterson | June 13, 1933 |
| 1,969,289 | Ackerman | Aug. 7, 1934 |
| 1,991,518 | Peterson | Feb. 19, 1935 |
| 2,055,671 | Ridgeway | Sept. 29, 1936 |